(12) United States Patent
Liu et al.

(10) Patent No.: US 10,386,490 B2
(45) Date of Patent: Aug. 20, 2019

(54) REDUCED SAMPLING LOW POWER GPS

(75) Inventors: Jie Liu, Medina, WA (US); Yuzhe Jin, Bellevue, WA (US); Nissanka Arachchige Bodhi Priyantha, Redmond, WA (US); Edward Hart, Redmond, WA (US); Amanda Souza de Paula, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

(21) Appl. No.: 13/550,454

(22) Filed: Jul. 16, 2012

(65) Prior Publication Data

US 2014/0015713 A1  Jan. 16, 2014

(51) Int. Cl.
| | | |
|---|---|---|
| *G01S 19/09* | (2010.01) | |
| *G01S 19/25* | (2010.01) | |
| *G01S 19/34* | (2010.01) | |
| *G01S 19/42* | (2010.01) | |
| *G01S 5/00* | (2006.01) | |

(52) U.S. Cl.
CPC .......... *G01S 19/09* (2013.01); *G01S 5/0036* (2013.01); *G01S 19/254* (2013.01); *G01S 19/258* (2013.01); *G01S 19/34* (2013.01); *G01S 19/42* (2013.01)

(58) Field of Classification Search
CPC .......... G01S 19/42; G01S 19/34; G01S 19/09; G01S 5/0036
See application file for complete search history.

(56) References Cited

U.S. PATENT DOCUMENTS

| | | | | |
|---|---|---|---|---|
| 4,797,677 A | * | 1/1989 | MacDoran | G01S 11/10 342/352 |
| 5,119,102 A | | 6/1992 | Barnard | |
| 5,134,407 A | | 7/1992 | Lorenz et al. | |
| 6,104,338 A | * | 8/2000 | Krasner | G01S 19/41 342/357.24 |
| 6,188,351 B1 | | 2/2001 | Bloebaum | |
| 6,285,316 B1 | | 9/2001 | Nir et al. | |
| 6,300,899 B1 | | 10/2001 | King | |

(Continued)

FOREIGN PATENT DOCUMENTS

| | | |
|---|---|---|
| CN | 1425226 | 6/2003 |
| CN | 103064092 | 4/2013 |

(Continued)

OTHER PUBLICATIONS

The PCT Search Report dated Feb. 17, 2015 for PCT application No. PCT/US2014/062438.

(Continued)

*Primary Examiner* — Cassi J Galt

(74) *Attorney, Agent, or Firm* — Arent Fox LLP

(57) ABSTRACT

Some implementations provide low power reduced sampling of global positioning system (GPS) locations. A server may be configured to assist a mobile device in determining a location from a plurality of GPS signal samples and corresponding time stamps provided by the mobile device, such as by identifying a set of possible reference locations, which may be used to calculate a location of the mobile device. In another example, the mobile device may sample GPS signals using a GPS receiver, compress the samples, and provide the compressed samples to the server for processing.

19 Claims, 8 Drawing Sheets

(56) References Cited

U.S. PATENT DOCUMENTS

| | | | |
|---|---|---|---|
| 6,313,786 | B1 | 11/2001 | Sheynblat et al. |
| 6,417,801 | B1 | 7/2002 | van Diggelen |
| 6,448,925 | B1 | 9/2002 | Shridhara |
| 6,449,485 | B1 | 9/2002 | Anzil |
| 6,466,164 | B1 | 10/2002 | Akopian et al. |
| 6,546,040 | B1 | 4/2003 | Eschenbach |
| 6,583,756 | B2 | 6/2003 | Sheynblat |
| 6,642,884 | B2 | 11/2003 | Bryant et al. |
| 6,700,533 | B1 | 3/2004 | Werb et al. |
| 6,731,701 | B2 | 5/2004 | Vorobiev et al. |
| 6,788,249 | B1 | 9/2004 | Farmer et al. |
| 6,828,935 | B1 | 12/2004 | Dunn et al. |
| 6,865,478 | B2 * | 3/2005 | Sirola ............ G01S 19/42 342/357.25 |
| 7,027,486 | B2 | 4/2006 | Sullivan |
| 7,266,142 | B2 | 9/2007 | Sullivan |
| 7,301,992 | B2 | 11/2007 | Kohli et al. |
| 7,505,508 | B2 | 3/2009 | Sullivan |
| 7,595,754 | B2 | 9/2009 | Mehta |
| 7,623,067 | B2 | 11/2009 | Raman et al. |
| 7,738,531 | B2 | 6/2010 | Patrick |
| 7,821,455 | B2 | 10/2010 | Chen et al. |
| 7,893,869 | B2 | 2/2011 | Gaal et al. |
| 8,024,013 | B2 | 9/2011 | Haartsen |
| 8,125,378 | B1 | 2/2012 | Jarpenvaa |
| 8,259,010 | B2 | 9/2012 | Ische et al. |
| 8,390,512 | B2 | 3/2013 | Ische et al. |
| 8,462,831 | B2 | 6/2013 | Sturza et al. |
| 2002/0005802 | A1 | 1/2002 | Bryant et al. |
| 2002/0120632 | A1 * | 8/2002 | Gremmert ........ G06F 17/30241 |
| 2002/0138198 | A1 | 9/2002 | Morita |
| 2003/0152134 | A1 | 8/2003 | Vorobiev et al. |
| 2004/0017311 | A1 | 1/2004 | Thomas et al. |
| 2004/0230824 | A1 | 11/2004 | Heil |
| 2006/0152409 | A1 | 7/2006 | Raman et al. |
| 2006/0208943 | A1 * | 9/2006 | Gronemeyer ........ G01S 19/09 342/357.27 |
| 2007/0063894 | A1 | 3/2007 | Yu |
| 2008/0252517 | A1 | 10/2008 | Fuchs et al. |
| 2009/0318167 | A1 | 12/2009 | Pon et al. |
| 2010/0117897 | A1 | 5/2010 | Riley et al. |
| 2010/0283673 | A1 | 11/2010 | Farrokhi et al. |
| 2010/0318292 | A1 | 12/2010 | Kulik et al. |
| 2011/0080320 | A1 | 4/2011 | Farrokhi et al. |
| 2011/0103432 | A1 | 5/2011 | Tangudu et al. |
| 2011/0279324 | A1 | 11/2011 | Bolotski et al. |
| 2011/0298658 | A1 | 12/2011 | Riley et al. |
| 2012/0146850 | A1 | 6/2012 | Liu et al. |
| 2012/0249368 | A1 | 10/2012 | Youssef et al. |
| 2013/0027245 | A1 | 1/2013 | Lennen |
| 2015/0116151 | A1 | 4/2015 | Liu et al. |

FOREIGN PATENT DOCUMENTS

| | | |
|---|---|---|
| CN | 103091687 | 5/2013 |
| JP | 2000235067 A | 8/2000 |
| JP | 2005241517 A | 9/2005 |
| JP | 2005526251 A | 9/2005 |
| JP | 2010501862 A | 1/2010 |
| JP | 2011095184 A | 5/2011 |

OTHER PUBLICATIONS

"International Search Report & Written Opinion for PCT Patent Application No. PCT/US2013/050747", dated Sep. 27, 2013, Filed Date: Jul. 16, 2013, 12 Pages.

Othieno, et al., "Combined Doppler and Time Free Positioning Technique for Low Dynamics Receivers", In IEEE/ION Position Location and Navigation Symposium (PLANS), Apr. 23, 2012, 6 Pages.

Kong, Seung-Hyun, "A Compressed Sensing Technique for GNSS Acquisition", In International Technical Meeting, Institute of Navigation, Jan. 30, 2012, 6 Pages.

Muthuraman, et al., "Coarse Time Navigation: Equivalence of Algorithms and Reliability of Time Estimates", In International Technical Meeting, Institute of Navigation, Jan. 30, 2012, 10 Pages.

Akopian et al, "A Fast Positioning Method Without Navigation Data Decoding for Assisted GPS Receivers," IEEE Transactions on Vehicular Technology, vol. 58, Issue 8, Oct. 2009, pp. 4640-4645.

Candes, "Compressive Sampling," Proceedings of the International Congress of Mathematicians, Madrid, Spain, Aug. 22-30, 2006, pp. 1-20.

Thor et al, "A Direct RF Sampling Multifrequency GPS Receiver," Position Location and Navigation Symposium, 2002 IEEE, Apr. 2002, pp. 44-51.

The European Office Action dated Feb. 1, 2016 for European Patent Application No. 13741955.2, a counterpart foreign application of U.S. Appl. No. 13/550,454, 7 pages.

Chen, et al., "A Cross-Correlation Mitigation Method Based on Subspace Projection for GPS Receiver", In Proceedings of the 25th International Technical Meeting of the Satellite Division of the Institute of Navigation, Sep. 17, 2012, pp. 1428-1434.

Translated Chinese Office Action dated Dec. 8, 2015 for Chinese patent application No. 201380038013.1, a counterpart foreign application of U.S. Appl. No. 13/550,454, 15 pages.

International Search Report and Written Opinion Issued in PCT Patent Application No. PCT/US2014/052429, dated Jan. 28, 2015, 17 Pages.

PCT Written Opinion dated Sep. 9, 2015 for PCT Application No. PCT/US14/062348, 7 pages.

"International Preliminary Report on Patentability IssueD in PCT Application No. PCT/US2014/052429", dated Sep. 28, 2015, 8 Pages.

Second Written Opinion Issued in PCT Patent Application No. PCT/US2014/052429, dated Jun. 9, 2015, 6 Pages.

Ya-peng, et al, "Waveform Design for Compressive Sensing Radar Based on Minimizing the Statistical Coherence of the Sensing Matrix", Journal of Electronics and Information Technology, vol. 33, No. 9, China Academic Journal Electronic Publishing House, Sep. 2011, pp. 2097-2102.

Ramos, et al., "LEAP: A Low Energy Assisted GPS for Trajectory-Based Services", UbiComp 2011, Sep. 17-21, 2011, Beijing, China (10 pages).

European Office Action dated Sep. 23, 2016 for European Patent Application No. 13741955.2, a counterpart foreign application of U.S. Appl. No. 13/550,454, 7 pages.

Office Action for U.S. Appl. No. 14/067,744, dated Sep. 14, 2016, Liu et al., "High-Sensitivity GPS Device With Directional Antenna", 19 pages.

Chinese Office Action dated Aug. 17, 2016 for Chinese Patent Application No. 201380038013.1, a counterpart foreign application of U.S. Appl. No. 13/550,454, 11 pages.

Office Action for U.S. Appl. No. 14/011,140, dated Jul. 28, 2016, Liu et al., "Cloud-Offloaded Global Satellite Positioning", 15 pages.

Chinese Office Action dated Nov. 28, 2016, for Chinese Patent Application No. 201480047380.2, a counterpart foreign application of U.S. Appl. No. 14/011,140 (10 pages).

Office Action for U.S. Appl. No. 14/067,744, dated Jan. 20, 2017, Liu, et al., "High-Sensitivity GPS Device With Directional Antenna", (7 pages).

The Chinese Office Action dated Mar. 7, 2017 for Chinese Patent Application No. 201380038013.1, a counterpart foreign application of U.S. Appl. No. 13/550,454.

The Chinese Office Action dated Apr. 20, 2017 for Chinese Patent Application No. 201480060131.7, a counterpart foreign application of U.S. Appl. No. 14/067,744.

Office Action for U.S. Appl. No. 14/011,140, dated Feb. 9, 2017, Liu et al., "Cloud-Offloaded Global Satellite Positioning", 16 pages.

"Third Office Action Issued in Chinese Patent Application No. 201380038013.1", dated Aug. 29, 2017, 9 Pages.

"Office Action Issued in Japanese Patent Application No. 2015-523193", dated Jun. 1, 2017, 7 Pages.

"Second Office Action Issued in Japanese Patent Application No. 2015-523193", dated Feb. 1, 2018, 5 Pages.

(56) References Cited

OTHER PUBLICATIONS

"Third Office Action Issued in Japanese Patent Application No. 2015-523193", dated Oct. 3, 2018, 6 Pages.

* cited by examiner

REDUCED SAMPLING LOW POWER GPS

BACKGROUND

Global positioning systems (GPS) typically consist of a device including a GPS receiver and multiple GPS satellites. The GPS receiver is configured to receive and decode GPS signals broadcast from the GPS satellites in order to determine a location of the device. Each of the GPS satellite signals are transmitted with a satellite-specific encoding, which can be used by a GPS receiver to identify the broadcasting GPS satellite. The GPS receiver is able to calculate the location of the device by decoding the satellite signal, identifying the broadcasting GPS satellites, and performing a series of computations on the data extracted from the decoded signals.

Many devices today include GPS receivers and support applications that provide location based services. Typically, the location based applications rely on location information to provide these services. Devices may obtain the location information from one of a variety of sources, including GPS receivers, cell-tower signals, FM radio signals, and/or WiFi signatures. While GPS receivers often provide the most accurate and reliable location information available to the mobile device, it is often the case that the other sources are preferred. For example, GPS receivers may consume relatively large amounts of power to sample the GPS signals, decode the GPS signals, and perform the calculations necessary to determine the location of the device. Therefore, some devices may have a preprogrammed preference to utilize the less accurate methods.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Implementations of a mobile device including a global positioning system (GPS) which can be used to determine a location of the mobile device are disclosed herein. In one example, the mobile device utilizes a server to aid in determining the location of the mobile device. For example, the mobile device includes a GPS receiver and a communication interface in communication with the server. The mobile device may sample GPS signals using the GPS receiver and provide the samples to the server for processing. In one example, the mobile device is configured to perform preprocessing on the samples to compress and/or decode at least some portions of the samples and the server is configured to processes the compressed samples directly without additional decoding. In one particular example, the GPS signal is compressed according to compressed sensing theory.

BRIEF DESCRIPTION OF THE DRAWINGS

The Detailed Description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
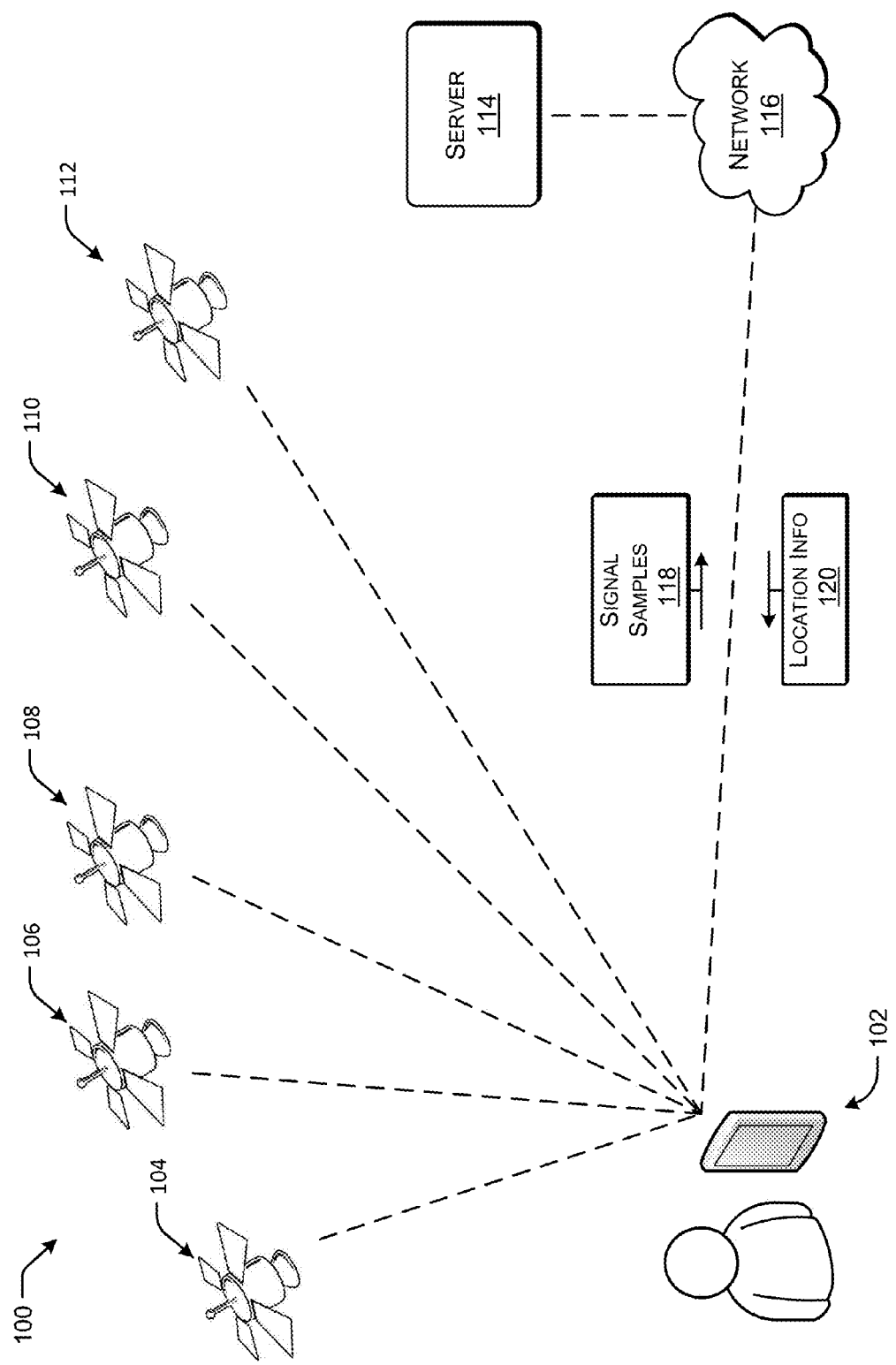
FIG. 1 is a pictorial view of an example of a GPS system according to some implementations.

The disclosed techniques describe implementations of a GPS system for determining locations related to mobile devices. When a GPS receiver is activated, the GPS receiver performs a series of power intensive steps to determine and maintain the location of the mobile device. First, the GPS receiver enters an acquisition phase. In the acquisition phase, the GPS receiver samples and decodes the GPS signal from each visible GPS satellite. The GPS signals include a time stamp and ephemeris data (data related to the location and trajectory of the transmitting satellite). Second, the GPS receiver performs a series of calculations based on the time stamp and ephemeris data extracted from the decoded GPS signals to determine an initial location. Third, the GPS receiver enters a tracking phase to maintain the location of the mobile device.

In order to sample and decode the entire signal from one or more GPS satellites, the GPS receiver is turned on for an interval, typically in the range of 30 seconds. The GPS receiver remains on for such a long period of time in part because the GPS satellites are configured to transmit data at a very low rate, typically in the range of 50 bits per second (bps) and around 32,000 samples are used to reconstruct the data contained in the GPS signals.

Next, the GPS receiver attempts to identify all GPS satellites in view of the mobile device i.e. the GPS satellites which broadcast the received GPS signals. This is done by detecting the presence of one or more satellite-specific C/A codes in the GPS signals. Each GPS receiver stores a C/A code template, which includes the C/A code for all GPS satellites. The C/A codes are designed to be orthogonal to each other, such that when the template is compared with a GPS signal the C/A codes corresponding to visible GPS satellites cause a signal spike. Thus, the GPS receiver can compare the C/A template with the received GPS signals to determine which GPS satellites are initiating the broadcasts.

However when comparing the C/A code template to the GPS signals, the GPS receiver compensates for Doppler shifts in the GPS signal caused by movement of both the satellites and the GPS receiver. For example, a rising GPS satellite (a satellite coming into view of the mobile device) moves at a rate of up to 800 meters per second (m/s) toward the GPS receiver, causing a frequency shift of 4.2 kilohertz (kHz). Likewise, a setting GPS satellite (a satellite leaving view of the mobile device) moves at a rate of up to 800 m/s away from the GPS receiver, causing a frequency shift of −4.2 kHz. The GPS receiver must compensate for the Doppler shift within a certain margin of error (for example, in some implementations 500 Hz is close enough) to correctly identify the broadcasting GPS satellites using the C/A code template. Therefore to compensate for the motion of the GPS receiver in addition to the movement of the satellites, the GPS receiver often performs 25-30 Doppler shift calculations and corresponding C/A code comparisons before finalizing a determination of the visible GPS satellites.

To identify an initial location, the GPS receiver also determines the distance between the mobile device and each of the visible GPS satellites called the "pseudorange." The pseudorange can be calculated using the propagation delay of the GPS signals. The propagation delay is broken down into two parts, i.e., a millisecond part and a submillisecond part called the "code phase". The millisecond part can be decoded from the packet frames and the code phase can be determined by monitoring the 1 ms repetition of the C/A code in the GPS signals.

Once the GPS receiver has identified the visible satellites, decoded the GPS signals, and calculated the pseudorange, the GPS receiver calculates an initial location. After the initial location is determined, the GPS receiver switches to a tracking phase to maintain the location of the mobile device. During the tracking phase, the GPS receiver attempts to adjust the Doppler frequencies and propagation delays to compensate for the shifts caused by the further movement of the satellites and the mobile device over time. By performing tracking the GPS receiver is able to quickly and inexpensively (at a relatively low power consumption rate) estimate changes in position.

However, if the GPS receiver does not continuously perform the tracking calculations the GPS receiver is required to perform the acquisition phase anew, which as discussed above is power-intensive and time-consuming. Therefore, most GPS receivers are configured to always remain active and are not duty-cycled by the mobile device.

FIG. 1 is a pictorial view of an example of a GPS system 100 according to some implementations. GPS system 100 includes mobile device 102 and GPS satellites 104, 106, 108, 110, and 112 from which mobile device may receive GPS signals. GPS system 100 also includes server 114 and network 116. Generally, mobile device 102 transmits and receives data to and from server 114 through network 116. Mobile device 102 may communicate with network 116 via wireless networks, such as a wireless local-area-network (WLAN), a short-range wireless network, such as Bluetooth®, or mobile networks provided through cell-towers, such as through code-division multiple access (CDMA) systems.

Mobile device 102 can be any GPS-enabled device such as a cell phone, smart phone, navigation device, tracking sensor, GPS sensor, or any other devices including a GPS receiver. In the present example, mobile device 102 is illustrated as a smart-phone.

GPS satellites 104-112 may comprise any of the satellites associated with the GPS satellite navigation (sat-nav) system. Additionally, although shown as five satellites, navigation satellites 104-112 represent any number of navigation satellites from which mobile device 102 can receive a GPS signal. GPS satellites 104-112 are uniquely identifiable by a satellite specific C/A code, as discussed above. Generally, GPS satellites 104-112 transmit GPS signals useful for geo-spatial positioning. The GPS signals are encoded and include time-based information useful for calculating position.

Mobile device 102 receives GPS signals from GPS satellites that are visible to mobile device 102 from mobile device 102 current location (are in line-of-sight of mobile device 102). Although, in some cases GPS signals received by mobile device 102 may be diffracted, reflected, and/or attenuated by various obstructions.

Mobile device 102 includes a GPS receiver, which is configured to sample GPS signals from satellites 104-112. In some examples, mobile device 102 may be configured to compress, preprocess, or otherwise manipulate GPS signal samples 118 before providing them to server 114. In one particular example, mobile device 102 may compress GPS signal samples 118 according to compressed sensing theory.

Mobile device 102 provides GPS signal samples 118 to server 114 via network 116. In some examples, mobile device 102 is a GPS sensor or GPS tracking device that does not include a wireless or mobile communication interface and, thus, mobile device 102 is unable to provide the GPS signal samples 118 to server 114 in real time (as the GPS signal is received). In this example, mobile device 102 may store the GPS signal samples 118 as data on a computer-readable storage media incorporated into mobile device 102. The data is then downloaded to server 114 at a later time, such that the previous location(s) of mobile device 102 may be determined or reconstructed at the time of download.

Once server 114 receives the GPS signal samples 118 from mobile device 102, server 114 determines an initial location of mobile device 102 and returns location information 120 via network 116 to mobile device 102. By using server 114 to determine the initial location, mobile device 102 is able to conserve the energy typically consumed during the power-intensive acquisition phase, extending overall battery life.

In this example, mobile device 102 provides the GPS signal samples 118 to server 114 as raw GPS samples with no preprocessing preformed on mobile device 102. In an alternative example, mobile device 102 may decode, encrypt or otherwise compress the GPS signal samples 118 before providing the signal samples 118 to server 114. In one particular example, mobile device 102 configures the GPS signal samples 118 according to compressed sensing theory before providing the compressed GPS signal samples to server 114.

In one example, mobile device 102 is a GPS tracking device used to track animal movements in order to determine a range of travel of the animal. In this example, real time locations are less necessary and the power savings can be increased beyond those described above. Mobile device 102 activates the GPS receiver to collect the GPS signal samples 118, stores the GPS signal samples 118 in a computer-readable storage media, and powers down the GPS receiver. This pattern repeats over a period of time and later, when mobile device 102 is recovered, the data related to the GPS signal is downloaded and server 114 determines the locations or range of travel associated with mobile device 102. In this example, the GPS receiver remains active for short periods of time, reducing the required size of the battery in mobile device 102 far beyond those typically associated with these types of tracking sensors.

Although described with respect to GPS, any of the techniques described herein may be implemented in association with other global or regional satellite navigation systems. In some cases, these techniques are used with sat-nav receivers capable of receiving signals from two or more different satellite navigation systems. By way of example, other global and/or regional satellite navigation systems may include Global Navigation Satellite System (GLONASS), Galileo, BeiDou, Compass, Indian Regional Navigation Satellite System (IRNSS), or Quasi-Zenith Satellite System (QZSS), among others.

Figure 2:
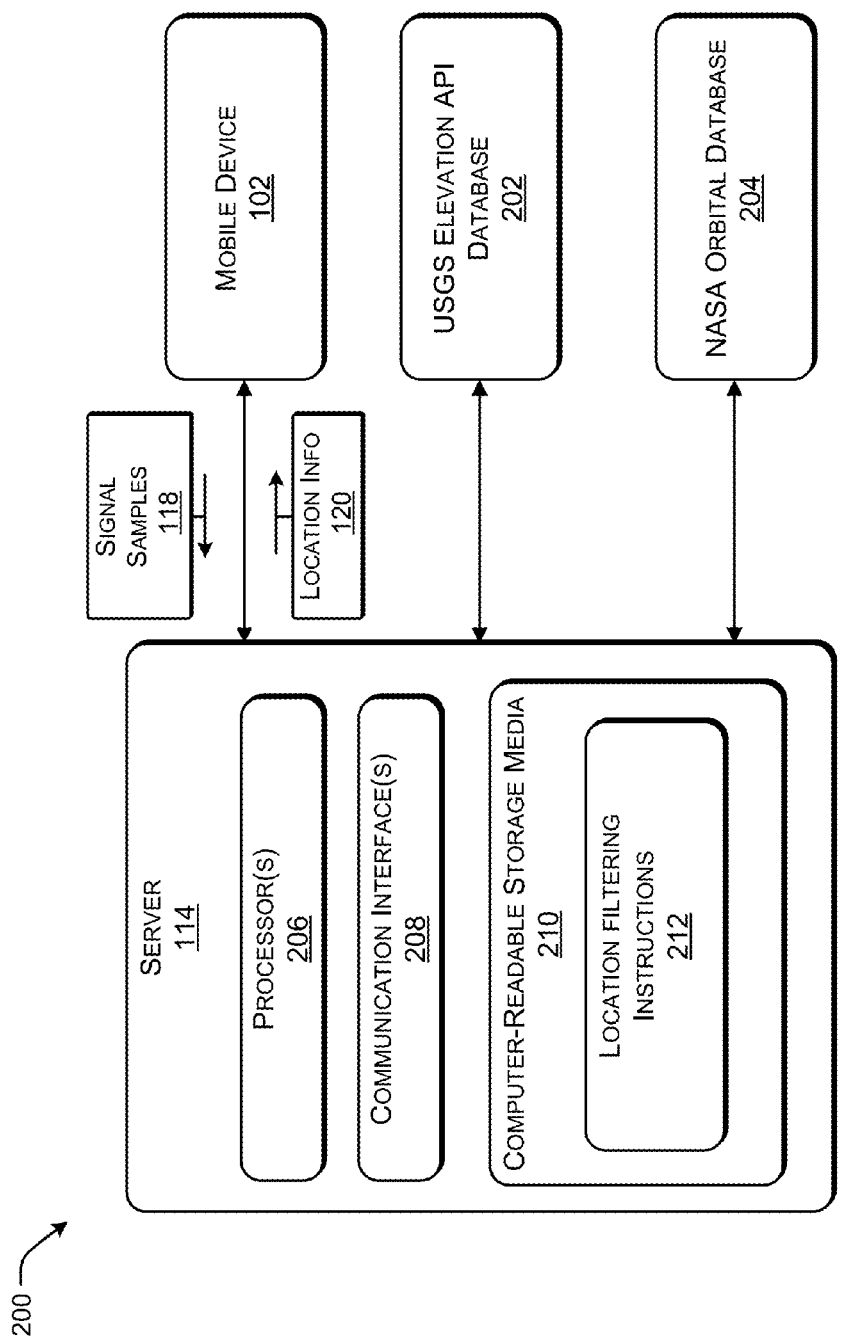
FIG. 2 is a block diagram of an example framework of a GPS system according to some implementations.

FIG. 2 is a block diagram of an example framework of a GPS system 200 according to some implementations. GPS system 200 includes mobile device 102, server 114, United States Geological Survey (USGS) elevation API database 202, and NASA orbital database 204.

Mobile device 102 includes one or more GPS receivers to sample GPS signals and one or more communication interfaces to provide the GPS signal samples 118 to server 114 and receive location information 120 in return. Server 114 includes one or more processors 206, a communication interface 208, and computer-readable storage media 210. Communication interfaces 208 are accessible by processors 206 to communicate data to and from mobile device 102 over a network, such as network 116 of FIG. 1.

Any number of program modules, applications, or components can be stored in the computer-readable storage media 210, including by way of example, a location filtering instructions 212. The location filtering instructions 212 stored in computer-readable storage media 210 and executable by processors 206 to cause server 114 to determine a location of mobile device 102 in response to receiving the GPS signal samples. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by the computing device.

In contrast, communication media may embody computer readable instructions, data structures, program modules, or other data in a modulated data signal, such as a carrier wave, or other transmission mechanism. As defined herein, computer storage media does not include communication media.

USGS Elevation API database 202 is accessible by server 114 via communication interfaces 208, such that server 114 is able to retrieve elevation data related to a location determined by server 114. Typically, server 114 provides latitude and longitude coordinates to USGS elevation API database 202 and receives elevation data related to the coordinates in return.

NASA Orbital database 204 is also accessible by server 114 via communication interfaces 208 and is used to retrieve almanac and ephemeris data related to the GPS satellites 104-112. Almanac data relates to the coarse orbit and status of satellites in Earth's orbit. Ephemeris data is related to the position and trajectory of the satellites.

USGS Elevation API database 202 and NASA orbital database 204 are two examples of a variety of databases available to server 114 to receive elevation, almanac, and ephemeris data. For example US Geodetic Survey computes the orbits, position, and trajectory of GPS satellites and makes the orbits, position, and trajectory publically available on the web.

In an example, mobile device 102 provides GPS signal samples 118 and time stamps corresponding to GPS signal samples 118 to server 114 via at least one of communication interfaces 208. In some cases, GPS signal samples 118 are downloaded from mobile device 102 and in others the GPS signal samples 118 are received via a wireless or mobile network from mobile device 102.

Once GPS signal samples 118 are received, location filtering instructions 212 cause processors 206 to determine the location of mobile device 102. To calculate the location of mobile device 102, server 114 needs to determine the time that GPS samples 118 were collected, the broadcasting (visible) GPS satellites, the ephemeris related to the visible satellites, and the pseudoranges.

In an example, server 114 identifies which GPS satellites are visible to mobile device 102 comparing the C/A code template to the GPS signal samples for each of the possible Doppler shifts. At this time, typically, a GPS receiver decodes the GPS signals to determine the time and ephemeris related to the initiated transmission. However, this process is time consuming and the time and ephemeris can be determined by server 114 in other manners as described below.

The time is received from mobile device 102 as the time stamp. While the precise time of broadcast which can be extracted from a GPS signal is more accurate, the time stamp applied at the time of receiving the GPS signals is sufficient to calculate an initial location of mobile device 102 within a reasonable range i.e. within a few meters.

The ephemeris is retrieved by server 114 from NASA orbital database 204. In one particular example, server 114 may fetch the ephemeris from NASA orbital database 204 periodically and store the information in computer-readable storage media 210 for use at a later time, such as in the case where the GPS signals were sampled and stored on mobile device 102 and downloaded to server 114 after a period of time.

Server 114 calculates the code phases for each of the visible GPS satellites 104-112 using the ephemeris data and encoded GPS signal samples 118. However, server 114 needs to determine the millisecond part of the propagation delay before the pseudorange is determined and the location of mobile device 102 identified. As discussed above, a GPS receiver determines the millisecond part of the propagation delay by decoding the packet frames of the GPS signal.

Rather than decoding the GPS signal, server 114 applies a technique called coarse-time navigation (CTN) to determine the location of mobile device 102 using a reference location within 150 kilometers (km) of the location of mobile device 102, the time stamp, and the code phases. For example, a cell phone can identify the nearest cell tower as a known reference location. However, in some instances, a reference location is not readily available.

In one example, mobile device 102 is configured to sample the GPS signals at regular intervals and server 114 can assume mobile device 102 has not traveled more than 150 km. In this example, server 114 utilizes past locations as the reference locations for calculating the location of mobile device 102. For instance, mobile device 102 may be a GPS tracking device placed on an animal and server 114 can assume the animal did not travel more than 150 km between sampling. Thus, if an initial location, such as the location the animal was tagged, is known then server 114 can use previous locations (starting with the tagging location and then each calculated location in sequence) as reference locations for determining the next location.

However, in some instances no past location is known and no reference location is provided by mobile device 102. In this instance, server 114 needs to identify a reference location to apply CTN. To do so server 114, uses the Doppler intersection and the ephemeris data to determine a possible position and one or more regions in which mobile device 102 may be located at the time the GPS signal was sampled. Server 114 then samples the regions spatially to identify a set of possible references location with known location data. For example, server 114 may sample the regions for known landmarks.

For each possible reference location, server 114 applies CTN to determine a set of possible locations. In some instances, a CTN-calculated location will not converge for each visible GPS satellite given a guessed reference location, and, thus, this location is discarded. From the CTN calculations that do converge, a set of possible locations is identified. However, only one of the set of possible locations is the actual location of mobile device 102. The other possible locations are known as "shadow locations" and may be eliminated as candidates by server 114.

The first step in eliminating the shadow locations is to constrain the possible locations to the surface of the Earth. Due to errors caused by guessing the reference locations, many of the possible locations identified are located at an elevation far above or below the surface of the Earth and these locations can be eliminated. For example, constraining the possible locations to an elevation range near the surface of the Earth, such as between −500 to 8000 meters (m) of evaluation.

Unfortunately, applying an elevation range by itself does not, typically, yield a unique or positively identified location. To eliminate the remaining shadow locations, server 114 utilizes its access to USGS elevation API database 202 via communication interfaces 208. Server 114 retrieves the true elevation of the Earth's surface for each of the remaining possible locations using the latitude and longitude coordinates. Utilizing the true elevations, server 114 eliminates the remaining shadow locations. Server 114 compares the elevation at each of the remaining possible locations to the true evaluation and if the elevations match, the actual location of mobile device 102 at the time the GPS signals were sampled has been identified. If, however, the elevations do not match the possible location is a shadow location and is eliminated.

Once the location of mobile device 102 is identified, the location is provided to mobile device 102 as location information 120. In the alternative, the location can be stored in a computer-readable storage media for later analysis or provided to a display for use, for example, in scientific research.

Figure 3:
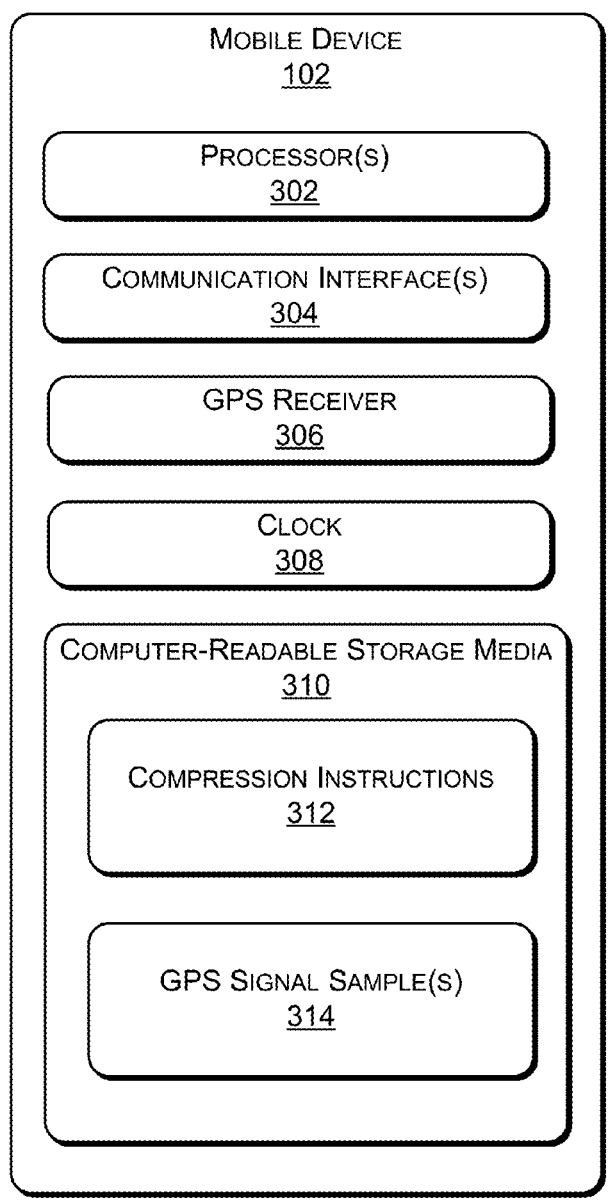
FIG. 3 is a block diagram of an example framework of a mobile device according to some implementations.

FIG. 3 is a block diagram of an example framework 300 of mobile device 102 according to some implementations. Mobile device 102 includes one or more processors 302, one or more communication interfaces 304, GPS receiver 306, clock 308, and computer-readable storage media 310. Computer-readable storage media 310, is illustrated, storing compression instructions 312 and one or more GPS samples 314.

Communication interfaces 304 are utilized to communicate data to a server, such as server 114 of FIGS. 1 and 2. Communication interfaces 304 is configured to communicate with wireless networks, such as a wireless local-area-network (WLAN), short-range wireless networks, such as Bluetooth®, a mobile network provided through cell-towers, such as through CDMA systems, or over a wired connection, such as via a universal serial bus (USB) interface.

GPS receiver 306 is configured to receive GPS signals from one or more satellites 104-112 and is capable of determining a position of mobile device 102. Although shown as integrated with mobile device 102, GPS receiver 306 may be external, but local. An external GPS receiver may communicate with mobile device 102 over a wired (e.g. USB) or wireless interface (e.g. Bluetooth®). In some cases, GPS receiver 306 is integrated with one of the communication interfaces 304. This integrated module provides cellular connectivity and GPS functionality. In some examples, an antenna of the integrated module is shared by the cellular and GPS sub-systems.

Clock 308 is configured to provide a time stamp that is associated with the time a GPS signal sample is received by GPS receiver 306. In one example, clock 308 is a WWVB receiver. WWVB is a radio station which broadcasts universal time signals around the globe via a continuous 60 kHz carrier wave, derived from a set of atomic clocks located at the transmitter sites.

In an example, GPS receiver 306 periodically samples GPS signals from satellites 104-112 and each of the GPS signal samples 314 are time stamped by clock 308. Time stamped GPS signal samples 314 are either stored in computer-readable storage media 310 or provided to server 114 via communication interfaces 304 for processing. If GPS signal samples 314 are provided to server 114, then mobile device 102 may receive a location from server 114 in response. If GPS signal samples 314 are stored then they may be downloaded or provided to server 114 at a later time for processing.

In some examples, GPS signal samples 314 are compressed according to compression instructions 312. Compression instructions 312 when executed by processors 302, may cause processors 302 to compress GPS signal samples 314 in a verity of ways, decode some portions of the GPS signal signals, or otherwise perform some type of preprocessing on GPS signal samples 314. In one instance, GPS signal samples 314 are compressed using standard compression techniques. In other instances, GPS signal samples 314 are compressed according to compressive sensing theory.

If GPS signal samples 314 are compressed according to compressive sensing theory, server 114 can be configured to determine the location of mobile device 102 directly from the compressed samples without decoding. GPS signal samples 314 can be compressed according to compressed sensing theory in either the time domain or the frequency domain. Example configurations of GPS signal samples 314 compressed according to compressed sensing theory are provided below with respect to FIGS. 5-7. Once GPS signal samples 314 are processed according to compression instructions 312, GPS signal samples 314 are either stored in computer-readable storage media 310 or provided to server 114 via communication interface 304 as described above.

The above described server 114 and mobile device 102 may be used in an environment or in a configuration of universal or specialized computer systems. Examples include a personal computer, a server computer, a handheld device or a portable device, a tablet device, a multi-processor system, a microprocessor-based system, a set-up box, a programmable customer electronic device, a network PC, and a distributed computing environment including any system or device above.

Figure 4:
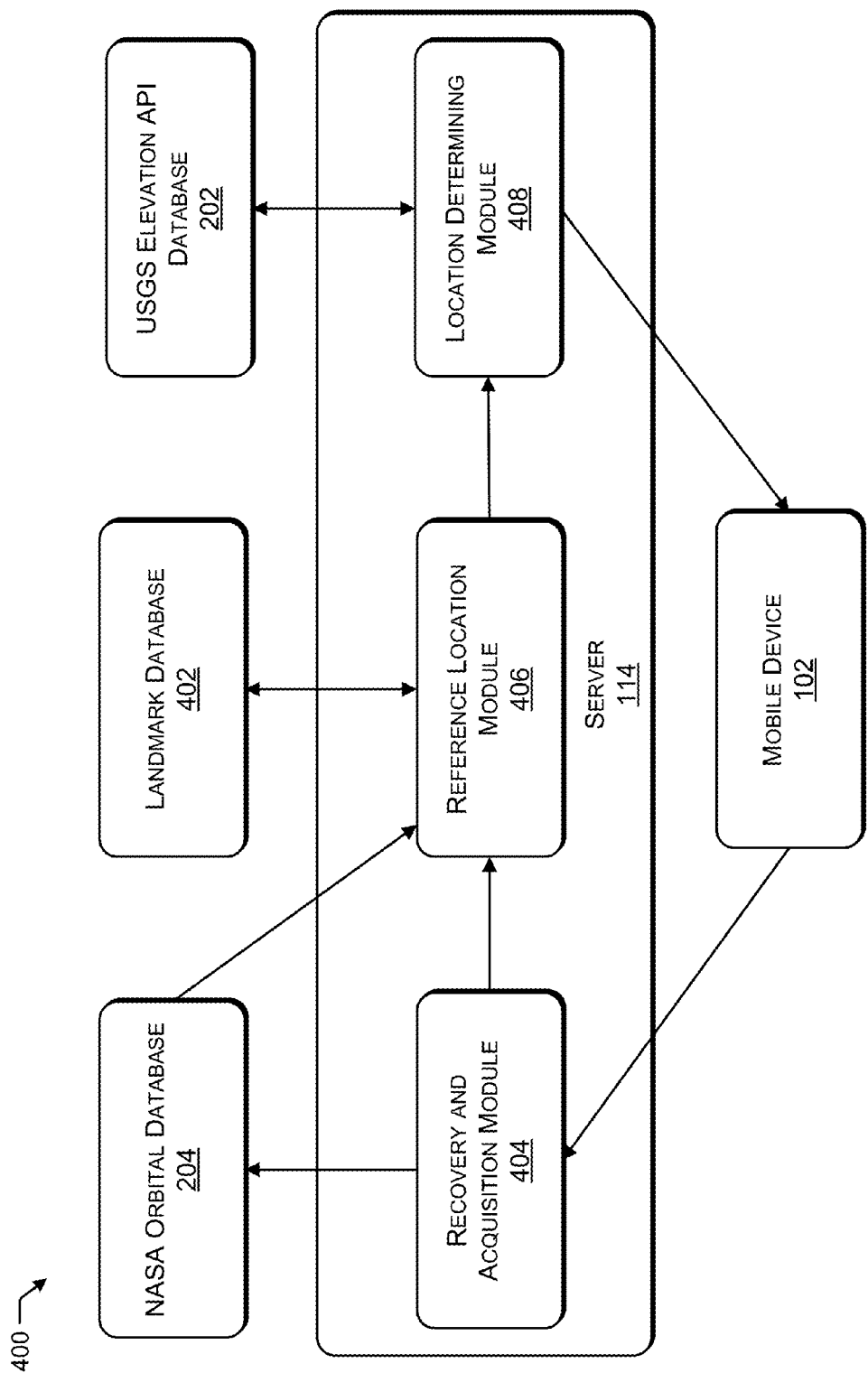
FIG. 4 is a system flow diagram of an example data flow according to some implementations.

FIG. 4 is a system flow diagram of an example data flow 400 according to some implementations. Data flow 400 illustrates the transmission of data between modules of server 114 and mobile device 102, USGS elevation API database 202, NASA orbital database 204, and landmark database 402.

As discussed above, mobile device 102 includes one or more GPS receivers to sample GPS signals and one or more communication interfaces to provide the GPS signal samples or compressed GPS signal samples to server 114. USGS elevation API database 202 provides elevation data related to locations determined by server 114. NASA Orbital database 204 provides almanac and ephemeris data related to the GPS satellites 104-112. Landmark database 402 is one or more databases including known reference locations throughout the United States, which can be provided to server 114.

As discussed above, server 114 includes a computer-readable storage media and any number of program modules, applications, or components can be stored in the computer-readable storage media. As illustrated server 114 includes a recovery and acquisition module 404, reference location module 406, and location determining module 408.

Recovery and acquisition module 404 is configured to receive GPS signal samples from mobile device 102 to recover the ID's and corresponding Doppler frequencies and code phases for each of the visible satellites. In one example, mobile device 102 provides raw GPS signal samples to recovery and acquisition module 404. In response, recovery and acquisition module 404 reconstructs the GPS signal from the raw GPS signal samples and recovers the satellite IDs, Doppler shifts, and code phases by performing the acquisition phase typically preformed by a GPS receiver, as discussed above. In another example, the GPS signal samples may be compressed according to compressed sensing theory by mobile device 102 and the recovery and acquisition module 404 may recover the ID's and corresponding Doppler frequencies and code phases for each of the visible satellites directly from the compressed samples without reconstructing the GPS signal using compressed sensing techniques.

Reference location module 406 is configured to determine one or more regions in which mobile device 102 sampled the GPS signals given the Doppler frequencies from recovery and acquisition module 404 and ephemeris from NASA orbital database 204 corresponding to the visible satellites. After determining one or more regions, reference location module 406 is configured to access landmark database 402 to determine possible reference locations within the regions.

Location determining module 408 is configured to identify a set of possible locations of mobile device 102 given a set of possible reference locations, the code phases, and ephemeris. Location determining module 408 is further configured to identify the actual location of mobile device 102 from the set of possible locations in part by using elevation data retrieved from USGS elevation API database 202.

In an example, recovery and acquisition module 404 receives a plurality of GPS signal samples or compressed GPS samples from mobile device 102. Recovery and acquisition module 404 recovers the ID's and corresponding Doppler frequencies and code phases for each of the visible satellites. For example, if raw GPS signal samples are received, recovery and acquisition module 404 reconstructs the GPS signal and compares the C/A code template to the reconstructed GPS signal for each possible Doppler frequency range. Once the visible (broadcasting) satellites are determined, recovery and acquisition module 404 determines the code phases by utilizing the repeating pattern of the C/A codes within the GPS signal.

Recovery and acquisition module 404 provides the satellite IDs, Doppler frequencies, and code phases to reference location module 406. Recovery and acquisition module 404 also provides the satellite IDs to NASA orbital database 204, which in turn provides ephemeris related to each satellite ID to reference location module 406.

Reference location module 406 first determines an estimated position of mobile device 102 by calculating the Doppler intersection of the signals based on the visible satellites. For example, from the Doppler shifts the speed of each visible satellite either towards or away from mobile device 102 can be determined. The position and velocity of each visible GPS satellite is received in the ephemeris. If the direction, velocity, and position of a satellite are known, the angle of the satellite can be determined. Once the angle of each visible GPS satellite is determined by reference location module 406, a cone representing the area of broadcasted of the GPS signal can be found for each visible satellite. The intersections of the cones provide one or more regions of mobile device 102.

After reference location module 406 determines the regions of mobile device 102, reference location module 406 samples each of the regions spatially to establish a set of possible reference locations i.e. known landmarks with known positions located within at least one of the regions. The known landmarks are identified and retrieved from landmark database 402.

Reference location module 406 provides the set of possible reference locations to location determining module 408, which identifies the actual location of mobile device 102. To do so location determining module 408, first applies CTN using each of the reference locations to determine a set of possible locations for the mobile device 102. As noted above, many of the locations in the set of possible locations are shadow locations due to the guessing of the reference locations.

Once the set of possible locations is determined, location determining module 408 begins to eliminate shadow locations by constraining the possible locations to the evaluation of near the surface of the Earth, for example between −500 and 8000 m. Next, location determining module 408 retrieves elevation data related to each of the remaining possible locations from USGS elevation API database 202 and compares the calculated elevation with the retrieved elevation. If the elevations do not match the possible location is eliminated as a candidate for the actual location of mobile device 102. If, however, the elevations match then location determining module 408 has identified a feasible actual location of mobile device 102. For all such feasible locations, location determining module 408 determines the one with the least dilution of precision and provides this location to mobile device 102, stores the location in a computer-readable storage media, or provides the location to another computing device for analysis.

Example methods for performing techniques described herein are discussed in detail below. These example methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote memories.

The example methods are sometimes illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer executable instructions that, when executed by one or more processors, perform the recited operations.

Figure 5:
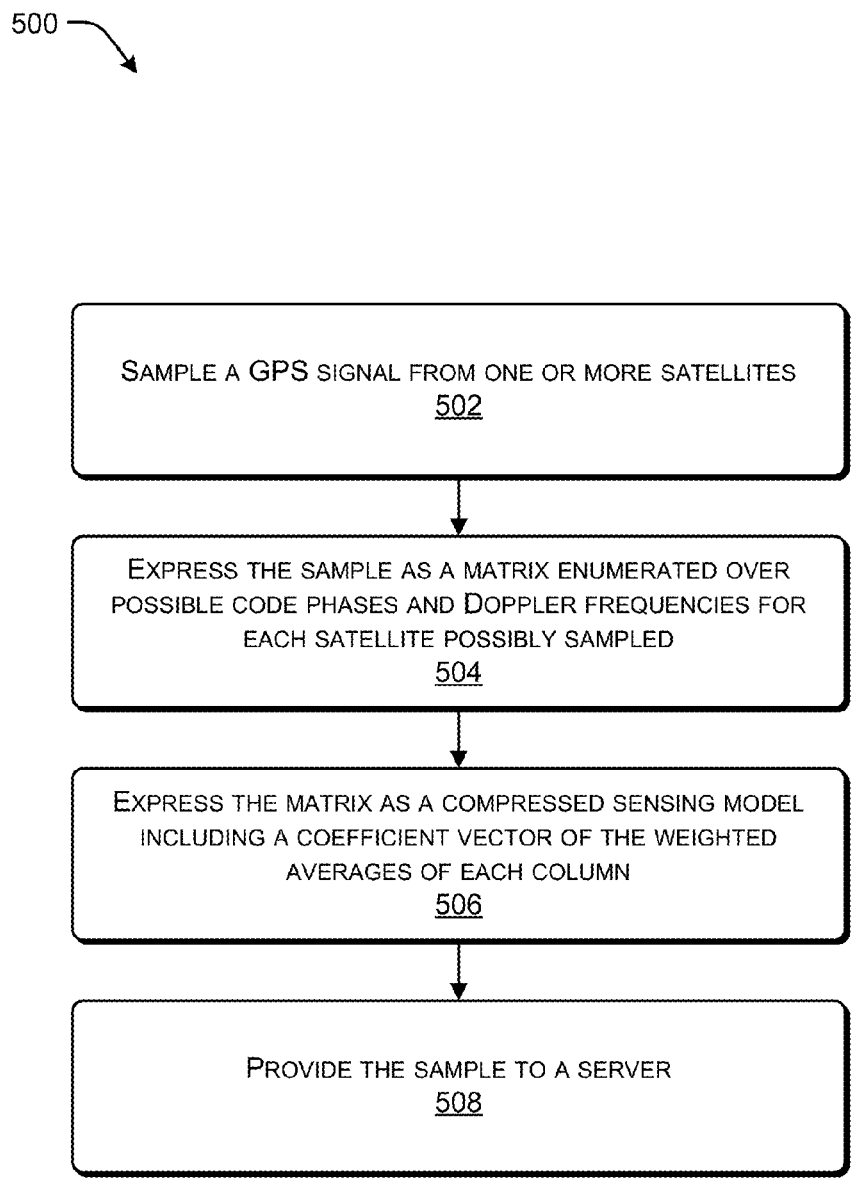
FIG. 5 is a flow diagram of an example process for compressing GPS signal samples according to some implementations.

FIG. 5 is a flow diagram of an example process 500 for compressing GPS signal samples according to some implementations. At 502, mobile device 102 samples a GPS signal from one or more satellites, such as satellites 104-112. The GPS signal is a combination signal including signals from each GPS satellite currently visible to mobile device 102. The GPS signal samples, each contain a portion of the GPS signal, which may be represented as the following equation:

$$r(t) = \sum_{k=1}^{N} \sqrt{2P_{rcv}} x^{(k)}(t-\tau^{(k)}) D^{(k)}(t-\tau^{(k)}) \cos(2\pi(f_{L1}+f_D^{(k)})t+\theta_{rcv}^{k}) + n^{(k)}(t),$$
for $t=1,2,\ldots,M$.

In the above equation, $r(t)$ is the received signal at GPS receiver 306, k is the satellite ID that can be determined using the C/A code, D is the data (which can be treated as a constant), $n(t)$ is the signal noise, $\tau^{(k)}$ is the propagation delay, and $f_D^{(k)}$ is the Doppler frequency.

At 504, mobile device 102 expresses the GPS signal samples as a matrix enumerated over possible code phases and Doppler frequencies for each satellite possibly sampled. Each of the possible shifted code phases and Doppler frequencies are known for all 31 of the currently active GPS satellites in the sat-nav system. Thus, mobile device 102 may express the equation $r(t)$ as the following matrix:

$$\begin{bmatrix} z^{(1)}(1,\tau_1^{(1)},f_1^{(1)}) & \ldots & z^{(1)}(1,\tau_a^{(1)},f_K^{(1)}) & \ldots & z^{(N)}(1,\tau_1^{(N)},f_1^{(N)}) & \ldots & z^{(N)}(1,\tau_a^{(N)},f_K^{(N)}) \\ \vdots & & \vdots & & \vdots & & \\ z^{(1)}(M,\tau_1^{(1)},f_1^{(1)}) & \ldots & z^{(1)}(M,\tau_a^{(1)},f_K^{(1)}) & \ldots & z^{(N)}(M,\tau_1^{(N)},f_1^{(N)}) & \ldots & z^{(N)}(M,\tau_a^{(N)},f_K^{(N)}) \end{bmatrix}$$

In the above matrix, $\tau_i^{(j)}$ means the i-th possible delay value of the GPS signal from a satellite j, $f_i^{(j)}$ denotes the i-th possible Doppler frequency of the satellite j. Therefore, all the columns of this matrix represent a full combination of the C/A code template of all satellites both visible and hidden from view with all possible code phases and Doppler frequency combinations.

At 506, mobile device 102 expresses the matrix above as a compressed sensing model according to compressed sensing theory including a coefficient vector of the weighted averages of each column. The resulting matrix expression is as follows:

$$\begin{bmatrix} z^{(1)}(1,\tau_1^{(1)},f_1^{(1)}) & \ldots & z^{(1)}(1,\tau_a^{(1)},f_K^{(1)}) & \ldots & z^{(N)}(1,\tau_1^{(N)},f_1^{(N)}) & \ldots & z^{(N)}(1,\tau_a^{(N)},f_K^{(N)}) \\ \vdots & & \vdots & & \vdots & & \\ z^{(1)}(M,\tau_1^{(1)},f_1^{(1)}) & \ldots & z^{(1)}(M,\tau_a^{(1)},f_K^{(1)}) & \ldots & z^{(N)}(M,\tau_1^{(N)},f_1^{(N)}) & \ldots & z^{(N)}(M,\tau_a^{(N)},f_K^{(N)}) \end{bmatrix} \begin{bmatrix} c_1 \\ \vdots \\ c_{aKN} \end{bmatrix} + \begin{bmatrix} n_1 \\ \vdots \\ n_M \end{bmatrix}$$

The vector c above consists of the coefficients, which are a weighted average of the corresponding column of the matrix z. The coefficient vector c is known to be or can be assumed to be sparse, since only one code phase and one Doppler frequency is populated for each visible satellite.

Since a sparse vector is generated, compressed sensing techniques can be applied to the compressed samples by server 114 to determine the visible satellites, Doppler shifts, and code phases using far fewer samples than is necessary using raw GPS signal samples or conventionally compressed GPS samples. For example, using the matrix expression above formulated in the time domain, the visible satellites, Doppler shifts, and code phases can be determined using 1,014 GPS signal samples if 8 satellites are in view, there are 40 possible Doppler frequency shifts, and 1000 possible code phases. In comparison using raw GPS signal samples, server 114 needs in the range of 32,000 samples to determine the visible satellites, Doppler shifts, and code phases. Thus, mobile device 102 collects fewer samples and mobile device 102 can transmit fewer samples to server 114 resulting in improved battery life of mobile device 102.

At 508, mobile device 102 provides the GPS signal sample to server 114. In some examples, mobile device 102 may provide the GPS signal samples to server 114 in real time via a WiFi or mobile network. In other examples, mobile device 114 may store the GPS signal samples compressed according to compressed sensing theory in a computer-readable storage media and provide the GPS signal samples to server 114 at a later time.

In one particular example, each GPS signal sample provided to server 114 is a linear projection of the matrix expression above, which can be written as $$r(1) = c(1)^*z(1) + c(2)^*z(2) + c(23)^*z(3) \ldots$$

Figure 6:
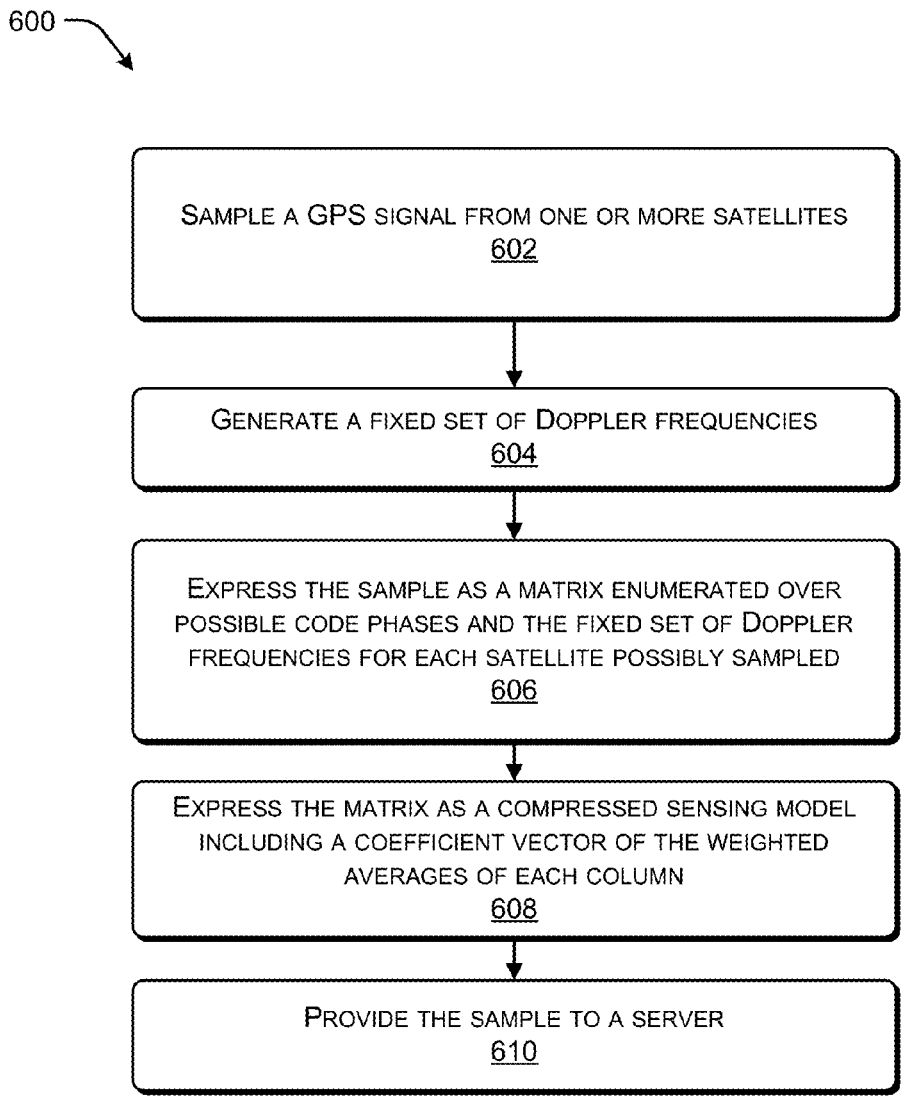
FIG. 6 is a flow diagram of an example process for compressing GPS signal samples according to some implementations.

FIG. 5 provides a first example of how the GPS signal samples received by mobile device 102 can be expressed using compressed sensing theory in the time domain. FIG. 6 provides an additional example process of configuring the GPS signal samples according to compressed sensing theory in the time domain.

FIG. 6 is a flow diagram of an example process 600 for compressing GPS signal samples according to some implementations. At 602, mobile device 102 samples a GPS signal from one or more satellites. The GPS signal is received from a set of currently visible GPS satellites, such as GPS satellites 104-112 of FIG. 1. As discussed above with respect to FIG. 4, the GPS signal samples, each contain a portion of the GPS signal, which may be represented as the following equation:

$$r(t) = \sum_{k=1}^{N} \sqrt{2P_{rcv}} x^{(k)}(t-\tau^{(k)}) D^{(k)}(t-\tau^{(k)}) \cos(2\pi(f_{L1}+f_D^{(k)})t+\theta_{rcv}^{k}) + n^{(k)}(t),$$
for $t=1,2,\ldots,M$.

In the above equation, $r(t)$ is the received signal at GPS receiver 304, k is the satellite ID that can be determined using the C/A code, D is the data (which can be treated as a constant), $n(t)$ is the signal noise, $\tau^{(k)}$ is the propagation delay, and $f_D^{(k)}$ is the Doppler frequency.

At 604, mobile device 102 generates a fixed set of Doppler frequencies. For example, mobile device 102 can fix the set of Doppler frequencies based on known physical constraints. The fixed set of Doppler frequencies can be expressed as $f_{ji}^{(i)}$, $I=1, \ldots, N$.

At 606, mobile device 102 expresses the samples as a matrix enumerated over possible code phases and the fixed set of Doppler frequencies for each GPS satellite possibly sampled. With a fixed set of Doppler frequencies the following matrix can be formed from the GPS signal samples:

$$\begin{bmatrix} z^{(1)}(1, \tau_1^{(1)}, f_{j_1}^{(1)}) & \cdots & z^{(1)}(1, \tau_a^{(1)}, f_{j_1}^{(1)}) & \cdots & z^{(N)}(1, \tau_1^{(N)}, f_{j_N}^{(N)}) & \cdots & z^{(N)}(1, \tau_a^{(N)}, f_{j_N}^{(N)}) \\ \vdots & & \vdots & & \vdots & & \\ z^{(1)}(M, \tau_1^{(1)}, f_{j_1}^{(1)}) & \cdots & z^{(1)}(M, \tau_a^{(1)}, f_{j_1}^{(1)}) & \cdots & z^{(N)}(M, \tau_1^{(N)}, f_{j_N}^{(N)}) & \cdots & z^{(N)}(M, \tau_a^{(N)}, f_{j_N}^{(N)}) \end{bmatrix}$$

In the above matrix, $\tau_i^{(j)}$ again represents the i-th possible delay value of the GPS signal from a satellite j.

At 608, mobile device 102 expresses the matrix above as a compressed sensing model including a coefficient vector of the weighted averages of each column. The resulting matrix expression is as follows:

$$\begin{bmatrix} z^{(1)}(1, \tau_1^{(1)}, f_{j_i}^{(1)}) & \cdots & z^{(1)}(1, \tau_a^{(1)}, f_{j_i}^{(1)}) & \cdots & z^{(N)}(1, \tau_1^{(N)}, f_{j_N}^{(N)}) & \cdots & z^{(N)}(1, \tau_a^{(N)}, f_{j_N}^{(N)}) \\ \vdots & & \vdots & & \vdots & & \\ z^{(1)}(M, \tau_1^{(1)}, f_{j_i}^{(1)}) & \cdots & z^{(1)}(M, \tau_a^{(1)}, f_{j_i}^{(1)}) & \cdots & z^{(N)}(M, \tau_1^{(N)}, f_{j_N}^{(N)}) & \cdots & z^{(N)}(M, \tau_a^{(N)}, f_{j_N}^{(N)}) \end{bmatrix} \begin{bmatrix} c_1 \\ \vdots \\ c_{aKN} \end{bmatrix} + \begin{bmatrix} n_1 \\ \vdots \\ n_M \end{bmatrix}$$

Again the vector c consists of the coefficients, which are weighted averages of the corresponding column of the matrix Z. Again the coefficient vector c is known to be or can be assumed to be sparse, since only one code phase and one Doppler frequency is populated for each visible GPS satellite.

Since a sparse vector is generated, compressed sensing techniques can be applied to the GPS signal samples by server 114 to determine the visible GPS satellites, Doppler shifts, and code phases using far fewer samples than is necessary using raw GPS signal samples or conventionally compressed GPS signal samples. For example, using the matrix expression above formulated in the time domain, the visible satellites, Doppler shifts, and code phases can be determined by server 114 using an early terminating L1 minimization (Lasso) solver on 719 GPS signal samples if 8 satellites in view of mobile device 102 and 1000 code phases are possible.

At 610, mobile device 102 provides the GPS signal samples to server 114. In some examples, mobile device 102 may provide the GPS signal samples to server 114 in real time via a WiFi or mobile network. In other examples, mobile device 114 may store the GPS signal samples in a computer-readable storage media and provide the samples to server 114 at a later time.

Figure 7:
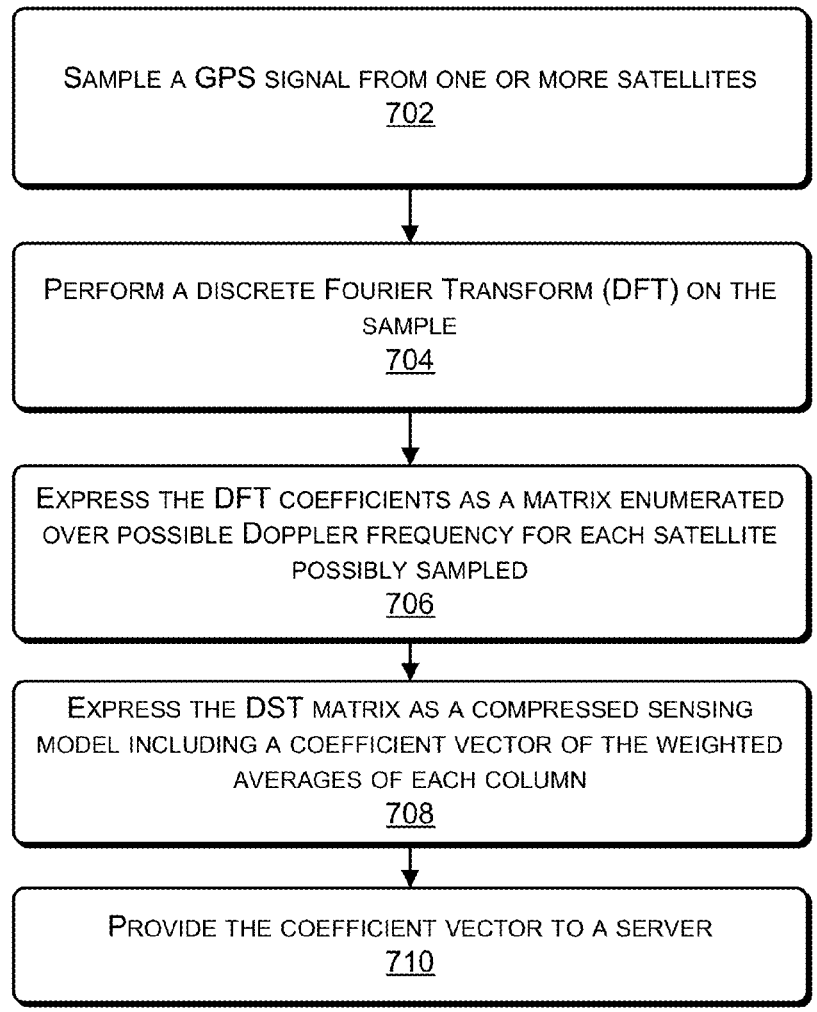
FIG. 7 is a flow diagram of an example process for compressing GPS signal samples according to some implementations.

FIGS. 5 and 6 provide two examples of methods to express the GPS signal samples as a compressed sensing model in the time domain. FIG. 7 provides an example of expressing the GPS signal samples as a compressed sensing model in the frequency domain.

FIG. 7 is a flow diagram of an example process 700 for compressing GPS signal samples according to some implementations. At 702, mobile device 102 sample a GPS signal from one or more GPS satellites. The GPS signal is received from a set of currently visible satellites, such as satellites 104-112 of FIG. 1. As discussed above with respect to FIGS.

4 and 5, the GPS signal samples, each contain a portion of the GPS signal, which may be represented as the following equation:

$$r(t) = \sum_{k=1}^{N} \sqrt{2P_{rcv}} x^{(k)}(t-\tau^{(k)}) D^{(k)}(t-\tau^{(k)}) \cos(2\pi(f_{L1}+f_D^{(k)})t + \theta_{rcv}^{k}) + n^{(k)}(t),$$
for $t=1, 2, \ldots, M$.

In the above equation, r(t) is the received signal at GPS receiver 304, k is the satellite ID that can be determined using the C/A code, D is the data (which can be treated as a constant), n(t) is the signal noise, $\tau^{(k)}$ is the propagation delay, and $f_D^{(k)}$ is the Doppler frequency.

At 704, mobile device 102 performs a discrete Fourier Transform (DFT) on the GPS samples. During the DFT the uncertainty due to the code phases, Doppler frequencies, and both the code phases and Doppler frequencies can be expressed as separate terms. Therefore, the DFT coefficients of r(t) can be expressed as the following equation:

$$R_l = \sum_{k=1}^{N} \left( \frac{1}{2} e^{-j\frac{2\pi l}{L}\tau^{(k)}} \cdot e^{j(\beta + f^{(k)} \cdot \tau^{(k)})} \cdot Z_{l - \frac{Lf_0^{(k)}}{2\pi}}^{(k)} + \frac{1}{2} e^{-j\frac{2\pi l}{L}\tau^{(k)}} \cdot Z_{l + \frac{Lf_0^{(k)}}{2\pi}}^{(k)} \right) + N_l$$

At 706, mobile device 102 expresses the DFT coefficients of r(t) as a matrix enumerated over possible Doppler frequency for each satellite possibly sampled. Enumerating over possible Doppler frequencies, $f^{(k)}$, the equation above can be rewritten as follows:

$$R_l = \sum_{k=1}^{N} \sum_{p=-(K-1)}^{K-1} a(l, k) \times b(p, k) \times c(l, p, k) + N_l$$

where $$a(l, k) \triangleq \frac{1}{2} e^{-j\frac{2\pi l}{L}\tau^{(k)}}$$

$$b(p, k) = \begin{cases} e^{j \cdot sign(p)(\beta + |p|f_0^{(k)} \cdot \tau^{(k)})}, \text{ where } pf_0^{(k)} \text{ is the correct Doppler frequency} \\ \qquad \qquad \text{of satellite } k, \text{ and } p \neq 0 \\ e^{j(\beta)} + e^{-j(\beta)}, \text{ when } pf_0^{(k)} \text{ is the correct Doppler frequency} \\ \qquad \qquad \text{of satellite } k, \text{ and } p = 0 \\ 0, \text{ otherwise} \end{cases}$$

and $$c(l, p, k) \triangleq Z_{l - \frac{Lpf_0^{(k)}}{2\pi}}^{(k)}$$

The above expression can then be expressed as the following matrix, matrix C, enumerated over possible Doppler frequencies:

$$\begin{bmatrix} c(0, -(K-1), 1) & c(0, -(K-2), 1) & \cdots & c(0, (K-1), N) \\ & \ddots & & \ddots & \vdots & \ddots \\ & c(L-1, -(K-1), 1) & c(L-1, -(K-1), 1) & \cdots & c(L-1, (K-1), N) \end{bmatrix}$$

At 708, mobile device 102 expresses the matrix as a compressed sensing model including a coefficient vector g of the weighted averages of each column. The resulting matrix expression is as follows:

$$\begin{bmatrix} R_1 \\ \vdots \\ R_L \end{bmatrix} = C \begin{bmatrix} g_1 \\ \vdots \\ g_{LN(2K-1)} \end{bmatrix} + \begin{bmatrix} N_1 \\ \vdots \\ N_L \end{bmatrix}$$

The vector g consists of the coefficients, which are weighted average of the corresponding column of the matrix C. The coefficient vector g is known to be or can be assumed to be sparse, since only one code phase and one Doppler frequency are populated for of each visible satellite.

Since a sparse vector is generated, compressed sensing techniques can be applied by server 114 to determine the visible GPS satellites, Doppler shifts, and code phases using far fewer GPS signal samples than is necessary using raw GPS signal samples or conventionally compressed GPS signal samples. For example, using the matrix expression above formulated in the time domain, the visible GPS satellites, Doppler shifts, and code phases can be determined by server 114 by applying compressed sensing theory with a group-sparse signal recovery solver on 1,032 GPS signal samples if 8 satellites are in view and there are 40 possible Doppler frequencies.

At 710, mobile device 102 provides the GPS signal samples to server 114. In some examples, mobile device 102 may provide the GPS signal samples to server 114 in real time via a WiFi or mobile network. In other examples, mobile device 114 may store the GPS signal samples in a computer-readable storage media and provide the GPS signal samples to server 114 at a later time.

Figure 8:
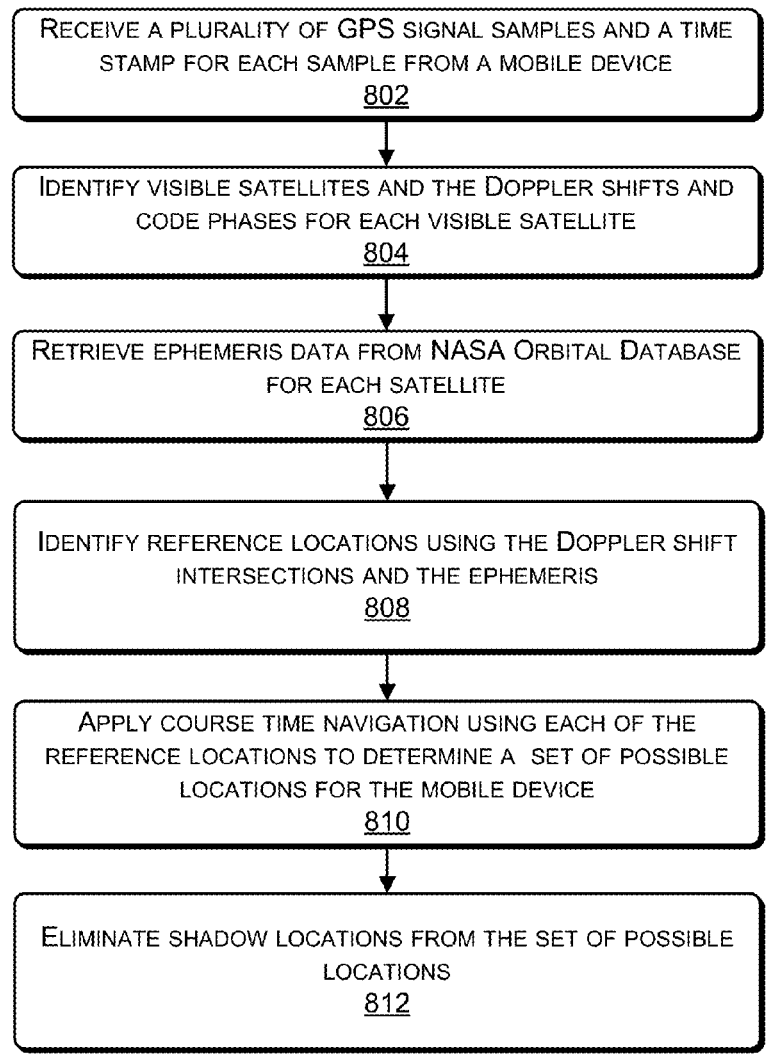
FIG. 8 is a flow diagram of an example process for determining a GPS location according to some implementations.

FIGS. 5-7 provide examples of methods to express the GPS signal samples as a compressed sensing model. FIG. 8 provides an example method of a server which can apply techniques for solving compressed sensing problems to the GPS signal samples expressed as a compressed sensing model to determine the location of mobile device 102.

FIG. 8 is a flow diagram of an example process 800 for determining a GPS location according to some implementations. At 802, server 114 receives a plurality of GPS signal samples and a time stamp for each GPS signal sample from mobile device 102. The GPS signal samples may be raw GPS data or compressed GPS signal samples. For example, GPS signal samples may be configured according to compressed sensing theory as described below with respect to FIGS. 5-7.

At 804, server 114 identifies visible GPS satellites and the Doppler shifts and code phases for each visible GPS satellite. If server 114 received raw GPS data, then server 114 compares the C/A code template to the GPS signal to determine the visible GPS satellites.

If, however, the GPS signal samples are configured using compressed sensing theory, server 114 may apply a group-sparse signal recovery solver on the GPS signal samples to determine the visible satellites and the corresponding Doppler frequencies and code phases. Different solvers are available for solving compressed sensing problems, for example an L1 minimization (Lasso) solver. Additionally, in some examples, early termination can be applied to iterations of the solver when the solution would violate known physical constraints which can be configured at server 114. By utilizing an early terminating solver the number of GPS signal samples needed to determine the visible GPS satellites and corresponding Doppler shifts and code phases can be further reduced.

At 806, server 114 retrieves ephemeris data from NASA Orbital Database 204 for each satellite. In one particular example, server 114 may retrieve ephemeris and almanac data from NASA orbital database 204 periodically and store the information in a memory, such as computer-readable storage media 210, for use at a later time. Storing the ephemeris and almanac data is particularly useful when the GPS signal samples are collected, stored on mobile device 102 for a period of time, and downloaded to server 114 later.

At 808, server 114 identifies a set of reference locations using the Doppler shift intersections and the ephemeris. For example, from the Doppler shifts the speed of each visible satellite either towards or away from mobile device 102 is determined. The position and velocity of each visible GPS satellite is determined using the ephemeris and the time provided by the time stamp. If the direction, velocity, and position of a satellite are known, the angle of the satellite can be determined.

Once the angle of each visible GPS satellite is determined, a cone representing the area of the broadcasted GPS signal with that angle can be found for each visible satellite. The intersection of the cones provides one or more regions of mobile device 102. After the regions are determined, the regions are sampled spatially to establish a set of references locations, i.e. known landmarks with known positions in the regions.

At 810, server 114 applies CTN using each of the reference locations to determine a set of possible locations for the mobile device 102. However, the reference locations are guessed and the set of possible locations may include one or more shadow locations as discussed above with respect to FIG. 2.

At 812, server 114 eliminates shadow locations from the set of possible locations. In one example, server 114 constrains the possible locations to being near the surface of the Earth. Due to errors caused by guessing reference locations many of the possible locations resulting from applying CTN are far away from the surface of the Earth. Thus, by constraining the possible locations to a range near the surface of the Earth, for example between −500 to 8000 m, many shadow locations are eliminated.

However, applying an elevation range by itself typically does not yield a unique location, but limits the remaining possible locations to a manageable number. To eliminate the remaining shadow locations, server 114 accesses an elevation database, such as USGS elevation API database 202, and retrieves the true elevation of the earth's surface. Server 114 compares each of the remaining possible locations to the true elevation and eliminates each possible location if the elevations do not match. By utilizing the true elevations, server 114 is able to eliminate the remaining shadow locations to determine feasible actual locations of mobile device 102, and from these, to select the one with the least dilution of precision.

Once the location of mobile device 102 is determined, the location can be provided to mobile device 102, stored in a computer-readable storage media for later use, or provided to another computing device for analysis.

It should be understood that subject matter defined in above does not necessarily limit the specific features or acts described. The term "techniques," for instance, may refer to device(s), system(s), method(s) and/or computer-readable instructions as permitted by the context above and throughout the present disclosure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method, comprising:
 receiving, by one or more communication interfaces of a server, global positioning system (GPS) signal samples including at least a first plurality of GPS signal samples and a corresponding first set of time stamps and a second plurality of GPS signal samples and a corresponding second set of time stamps from a mobile device, wherein the first set of time stamps and the second set of time stamps are separated by a period of time;
 identifying, for a selected GPS signal sample, by one or more processors of the server in response to receiving the GPS signal samples, a set of visible satellites and, for each visible satellite of the set of visible satellites, identifying a corresponding Doppler frequency and code phase from the selected GPS signal sample;
 requesting, by the one or more processors of the server, ephemeris data from a database;
 identifying, for the selected GPS signal sample, by the one or more processors of the server, a set of possible reference locations based at least on the corresponding Doppler frequency or the ephemeris data of at least one visible satellite of the set of visible satellites;
 determining, for the selected GPS signal sample, and by the one or more processors of the server, possible locations associated with the selected GPS signal sample, each of the possible locations corresponding to one of the possible reference locations, and the possible locations including a location of the mobile device at a time indicated by the time stamp corresponding to the selected GPS signal sample;
 eliminating a possible location by:
  requesting, from an additional database, elevation data corresponding to each of the possible locations;
  comparing the elevation data to an elevation of the possible location;
  determining that the elevation of the possible location does not correspond to elevations included in the elevation data;
  eliminating the possible location; and
 selecting, as the location of the mobile device at the time indicated by the time stamp corresponding to the selected GPS signal sample, a remaining location that has a least dilution of precision.

2. The method of claim 1, wherein the possible locations include at least one shadow location and the method further comprising eliminating any shadow locations to determine the location of the mobile device.

3. The method of claim 2, wherein determining the set of possible locations comprises applying a coarse time navigation (CTN) method to each of the possible reference locations.

4. The method of claim 1, wherein receiving, by the one or more communication interfaces of the server, the GPS signal samples further comprises receiving the GPS signal samples via a GPS receiver for processing.

5. The method of claim 1, wherein eliminating the possible location comprises restraining the possible locations to a range near the Earth's surface.

6. The method of claim 1, wherein the possible reference locations are identified in part by calculating intersections of angles of arrival of satellite signals inferred from the Doppler frequency of received satellite signals.

7. The method of claim 1, wherein the GPS signal samples are compressed according to compressed sensing theory.

8. The method of claim 7, wherein the GPS signal samples are compressed in a time domain.

9. The method of claim 7, wherein the GPS signal samples are compressed in a frequency domain.

10. The method of claim 1, wherein identifying the set of visible satellites comprises applying a sparse signal recovery solver to the GPS signal samples.

11. The method of claim 1, wherein identifying the set of visible satellites comprises applying a L1 minimization (Lasso) Solver to identify a presence of a signal of a visible satellite of the set of visible satellites in the GPS signal samples.

12. A computer-readable storage device storing instructions that, when executed by one or more processors, cause the one or more processors to:
 receive global positioning system (GPS) signal samples including at least a first plurality of GPS signal samples and a corresponding first set of time stamps and a second plurality of GPS signal samples and a corresponding second set of time stamps from a mobile device, wherein the first set of time stamps and the second set of time stamps are separated by a period of time;
 identify, for a selected GPS signal sample, a set of visible satellites and, for each visible satellite of the set of visible satellites, identify a corresponding Doppler frequency and code phase from the selected GPS signal sample;
 retrieve ephemeris data of the set of visible satellites;
 identify, for the selected GPS signal sample, possible reference locations inferred at least in part from the corresponding Doppler frequency or the ephemeris data of at least one visible satellite of the set of visible satellites;
 determine, for the selected GPS signal sample, possible locations associated with the selected GPS signal sample, each of the possible locations corresponding to one of the possible reference locations, the possible locations including a location of the mobile device at a time indicated by the time stamp corresponding to the selected GPS signal sample;
eliminate a possible location by:
   retrieving elevation data related to each of the possible locations;
   comparing the elevation data to an elevation of the possible location;
   determining that the elevation of the possible location does not correspond to elevations included in the elevation data; and
   eliminating the possible location; and
select a remaining location that has a least dilution of precision as the location of the mobile device.

13. A server comprising:
one or more processors;
one or more communication interfaces receiving global positioning system (GPS) signal samples including at least a first plurality of GPS signal samples and a corresponding first set of time stamps and a second plurality of GPS signal samples and a corresponding second set of time stamps from a mobile device, wherein the first set of time stamps and the second set of time stamps are separated by a first period of time; and
one or more computer-readable storage medium storing instructions that, when executed by one or more processors, cause the one or more processors in response to receiving the GPS signal samples to:
   identify, for at least one GPS signal sample, a set of visible satellites;
   identify, for each visible satellite of the set of visible satellites, a corresponding Doppler frequency and code phase from the at least one GPS signal sample;
   request ephemeris data from a database;
   identify, for the at least one GPS signal sample, possible reference locations based at least on the corresponding Doppler frequency or the ephemeris data of at least one visible satellite of the set of visible satellites;
   determine possible locations associated with the at least one GPS signal sample based at least in part on the code phase of at least one visible satellite of the set of visible satellites, the ephemeris data, and the possible reference location, the possible locations including a location of the mobile device associated with at least one of a first time stamp from the first set of time stamps or second time stamp from the second set of time stamps;
   eliminate a possible location by:
      requesting elevation data from another database corresponding to each of the possible locations;
      comparing the elevation data to an elevation of each of the possible locations; and
      eliminating at least one of the possible locations if the elevation is not a match; and
   select a remaining location that has the least dilution of precision as the location of the mobile device.

14. The server of claim 13, wherein the one or more communication interfaces receiving the GPS signal samples further comprises receiving the GPS signal samples via a GPS receiver of a mobile device for processing.

15. The server of claim 13, wherein eliminating the at least one shadow location is based at least in part on elevation data associated with a possible location of the possible locations.

16. The server of claim 13, wherein eliminating the at least one shadow location comprises restraining the possible locations to a range near the Earth's surface.

17. The computer-readable storage device of claim 12, wherein the possible reference locations are identified in part by calculating the intersections of angles of arrival of satellite signals inferred from the corresponding Doppler frequency of satellite signals received from the set of visible satellites.

18. The method of claim 1, wherein determining the possible locations associated with the selected GPS signal sample is based at least on one of the code phase or the ephemeris data.

19. The computer-readable storage device of claim 12, wherein determining, for the selected GPS signal sample, the possible locations associated with the selected GPS signal sample, is based at least on one of the code phase or the ephemeris data.

* * * * *